United States Patent Office 2,809,950
Patented Oct. 15, 1957

2,809,950

CURABLE DISPERSIONS OF CHLOROSULFONATED ETHYLENE POLYMERS AND PROCESS OF COATING WITH SAME

George Henry Bowers III, Wilmington, Del., assignor to E. I. du Pont de Nemours and Company, Wilmington, Del., a corporation of Delaware No Drawing. Application June 10, 1955,
Serial No. 514,770

6 Claims. (Cl. 260—29.6)

This invention is directed to certain chlorosulfonated polyethylenes and more particularly to stable, compounded, aqueous dispersions of said polyethylenes and their use as paints.

Conventional paints in which the vehicle is an oil, a varnish, or a resin solution, have been replaced in part by paints in which the vehicle is a water-containing binder such as casein or finely dispersed rubber particles in the form of a latex. These "water paints" have advantages of low cost, absence of odor and fire hazard, and ease of application. A preferred vehicle is an aqueous dispersion of a rubber-like copolymer of butadiene and styrene. These known waterbase compositions, however, have the disadvantage of poor outdoor durability.

The chlorosulfonated solid polymers of ethylene and of other polymerizable hydrocarbons, described in U. S. 2,586,363 of McAlevy, issued February 19, 1952, are elastomers with unusual resistance to the action of sunlight, ozone, and other agencies responsible for the deterioration of exposed paint films; accordingly, said polymers might be thought suitable as paint vehicles. However, until recently, they have not been available in the form of fine aqueous dispersions. G. H. Bowers in U. S. patent application Serial No. 369,244, filed July 20, 1953, of which this application is a continuation-in-part, describes the preparation of a water dispersion of chlorosulfonated polyethylene by first dispersing a dilute solution of the material in an inert volatile solvent (such as carbon tetrachloride) in water by means of dispersing agent, distilling off the solvent and making the resulting fine dispersion of chlorosulfonated polyethylene alkaline. The Bowers application further describes the compounding of the latex with polyvalent metal oxides and the subsequent curing of the material, by heating, after having been deposited from the latex. The resulting latices may be used for making self-supporting films, for the impregnation of paper, cloth, or other porous material, and when heat can be applied for curing, said latices may be used for the coating of surfaces. The exceptional resistance of the chlorosulfonated polyethylene to ozone makes the coated articles remarkably resistant when used outdoors or near electrical equipment. It is noted, however, that the requirement that the composition be cured by heat when coating surfaces excludes them as paints under normal conditions. The uncured material lacks many of the essential paint properties which are developed on curing.

It is an object of this invention to develop a water paint based on a dispersion of chlorosulfonated polyethylene which develops high resistance as a paint film without the application of heat. It is a further object of this invention to incorporate a curing agent and an opacifying pigment into an alkaline aqueous dispersion of a chlorosulfonated polyethylene resulting in a novel paint film which cures rapidly on drying at ordinary temperatures.

The present water paint which is capable of curing on air drying at ordinary temperatures is produced by forming an aqueous latex of a chlorosulfonated polyethylene, making the resulting dispersion alkaline and then incorporating therein a polyvalent metal compound curing agent and an opacifying pigment.

One of the preferred methods of preparing the compounded latex is to first form a dispersion of the chlorosulfonated hydrocarbon polymer, make it basic, and then add thereto a dispersion of the well known metal oxide curing agents together with compounding agent for the chlorosulfonated hydrocarbon polymers. This addition can be made without coagulation and the resulting compounded latex has a longshelf-life.

The latex is preferably prepared from an organic solution of a chlorosulfonated polyethylene by emulsifying the solution in water containing suitable emulsifying and/or dispersing agents and subsequently removing the organic solvent from the emulsion to leave an aqueous dispersion of the solid polymer. This dispersion may then be subjected to further evaporation to concentrate the polymer content of the dispersion. The latex in this form is then made basic and the compounding and curing agents known to be effective for curing the polymer are added. The latex may also contain suitable sequestering agents with or without thickeners.

It has been further desirable in forming the compounded latex to prepare a dispersion of the compounding and curing agents prior to adding these agents to the basic latex. If desired, the addition can be made in the reverse order. The dispersion of such agents may be prepared by any suitable process, one of which is by the use of the conventional ball milling technique in which the polyvalent metal oxide and other curing agents for the polymer are ground in water with a suitable amount of dispersing agent, protective colloid and a sequestering agent. Any other suitable method of preparing the dispersion of these compounding agents may be employed.

In order to prevent separation of the various ingredients of the films from the final composite latex, which may result in unequal curing, it is sometimes desirable to have thickeners present in the film to counteract any tendency of this nature. These thickeners may be added to the latex, to the dispersion of the compounding agents or to the compounding latex in order to result in a film from which the ingredients will not separate.

The preferred chlorosulfonated polyethylene contains 0.4 to 3% sulfur and 15 to 45% chlorine. The latex compositions may be rendered basic by the addition of a base. It has been found that optimum results are realized by the use of borax, trisodium phosphate, tetrapotassium pyrophosphate, tetrasodium pyrophosphate, and the alkali metal hydroxides and carbonates.

Any suitable dispersing agent, protective colloid, or thickening agent may be present in the latex of the chlorosulfonated hydrocarbon polymer or the dispersed compounding agents. For dispersing the latex the following dispersing agents may be utilized: polyoxyethylene sorbitan monolaurate, polyoxyethylene sorbitan monooleate, dodecyl phenyl-polyglycol ether, the sodium salt of the ½ sulfuric acid ester 2-methyl-7-ethyl undecanol-4, high molecular weight carboxylic acid esters, alkyl aryl polyether alcohols and the sulfonated long chain alcohols. The dispersing agents should be used in amounts ranging from 2% to 10% by weight of the substituted polymer.

Thickening agents which may be used are, for example, the polydioxolanes, partially hydrolyzed polyvinyl acetate, casein, methyl cellulose, natural colloids and the like. As little as possible of thickeners should be employed in order to reduce their effect on the final cured product but sufficient to give the desired result. The sequestering agents used in the preparation of dispersions such as those of polyvalent metal oxides includes, for example, sodium silicate, tetrapotassium pyrophosphate, sodium pyrophosphate and trisodium phosphate.

The sequestering effect is a function of the anion's ability to tie up PbO and MgO in such a manner that no $Pb^{++}$ or $Mg^{++}$ ions can be present and this prevents coagulation. The addition of sequestering agents to the latex alone should be sufficient to protect the latex against positive ion formation, but upon mixing (a) a local high concentration of PbO or MgO is obtained upon addition of metal oxides, thereby producing instability and/or (b) the tie up or sequestering action is slow and positive ions upon addition of metal oxide are developed. As these sequestering agents are themselves basic in character they can be used as alkalizing agents. These agents should be employed to the extent of 2 to 10% based on the weight of the substituted polymer in order to provide a stabilized dispersion of the compounding agents and a long shelf-life for the compounded latex after combination of the latex with the dispersed compounding agents.

In the preparation of the latex, applicant prefers to employ as the organic solvent for the substituted hydrocarbon polymer carbon tetrachloride or toluene although other suitable organic solvents may be used. In selecting the organic solvent it should be sufficiently stable during vacuum distillation to give a stable dispersion of the polymer in water when the solvent is removed by evaporation. Sufficient of the solvent should be employed to dissolve the chlorosulfonated hydrocarbon polymer, upon the evaporation of which that polymer remains as a dispersion in the aqueous phase.

In the formation of the latex compositions it is desirable that all of the organic solvent present be stripped from the dispersion since residual quantities of the solvent result in unstable dispersions. Vacuum evaporation is desirable to effect this result and may be continued beyond the time required for removal of all the organic solvent to decrease the water content of the latex.

In a typical preparation of the aqueous dispersions used in the present invention, a chlorosulfonated polyethylene containing 1.5% S and 27.5% Cl, in the form of a 10.5% solution in carbon tetrachloride was emulsified in water containing 1.4% of the sodium salt of the sulfuric acid half-ester 2-methyl-7-ethyl undecanol-4. The carbon tetrachloride was then distilled off under reduced pressure at 50° C. The resulting latex had a pH of 2.2, a solids content of 38.2%, and a particle size of 2 to 4 microns. Before compounding, the pH of the latex was brought to 11.5 by adding a saturated solution of trisodium phosphate.

Two requirements in the compositions of the paints of the present invention are (1) a curing agent and (2) an opacifying pigment. The curing agents are inorganic compounds of polyvalent metals, such as magnesium, calcium, barium, zinc, and lead and include the oxides, hydroxides, and salts, including basic salts of weak acids with dissociation constants less than $1 \times 10^{-3}$. These curing agents are set forth in U. S. Patent 2,416,060 to McAlevy. For the present novel paints, magnesium oxide and lead oxide are preferred and the preferred amounts are 10 to 60 parts by weight per 100 parts of chlorosulfonated polyethylene. The opacifying pigments are those commonly used in paint formation, such as zinc oxide, zinc sulfide, barium carbonate, barium sulfate, lead carbonate, lead sulfate, titanium dioxide and co-precipitated mixtures, such as lithopone which is a mixture of zinc sulfide and barium sulfate. Examples of the colored opacifying pigments are the chromates of zinc, lead and barium, etc., red lead, ferric oxide, chromic oxide and carbon black. Colored paints may be made with the above colors, either alone or mixed with white, also using when necessary, as in ordinary paint formulation, the brightly colored organic and inorganic lakes and toners. Fillers, such as asbestos and mica, anti-mold agents, flatting agents, and the like may also be used. In general, material used in ordinary paints are useful in the paints of the present invention.

The compounds used as accelerators for the vulcanization of natural rubber may also be added for their further effect in the curing of chlorosulfonated polyethylene paint films, but their use is not necessary and at times their use is undesirable because they tend to cause changes in the paint before its application. Typical accelerating agents of this class are benzothiazyl disulfide, 2-mercaptoimidazoline, zinc dibutyldithiocarbamate and diphenyl guanidine. These agents are disclosed in McAlevy 2,416,060.

The curing of the chlorosulfonated polyethylene paint films of the present invention takes place satisfactorily at temperatures at which paints, including outside paint, are normally applied, that is, from about 5° to 40° C. (41° to 104° F.). Curing in this connection means the development of, or great increase in, properties, such as hardness and other chemical resistance, tensile strength, toughness, and insolubility in organic solvents, which are absent or poorly developed in the uncured material. Upon application of said paint, curing starts immediately and proceeds rapidly; the resulting films can be safely exposed to normal service conditions, such as outdoor exposure immediately, and the above desirable properties are well developed after one or two weeks at ordinary temperatures.

To illustrate the use of an air-drying paint of chlorosulfonated polyethylene latex compounded in various ways the following compositions were made up and tested by painting them on wood (red cedar) and on concrete allowing the films to air-dry (for not more than one week) and exposing outdoors in the usual paint exposure racks and to accelerated aging conditions in the Weather-Ometer. The curing agents selected were litharge, magnesium oxide, tribasic lead maleate, and calcium carbonate. The pigment was a mixture of seven parts of titanium dioxide, two of lithopone, and one of mica.

The insoluble materials incorporated into the latex must be added in the form of fine dispersions and all dispersions or solutions added must be neutral or preferably alkaline. Dispersing agents are necessary for dispering the chlorosulfonated polyethylene, originally as a solution in carbon tetrachloride, and for dispersing the insoluble compounding ingredients and also for maintaining these dispersions. The sequestering agents are desirable, but not essential, for increasing the stability of the dispersions containing metallic compounds.

In compounding the latex, the insoluble ingredients were added in the form of aqueous dispersions of the following compositions:

| | Parts by weight |
|---|---|
| Lead oxide | 200 |
| Casein | 7 |
| Sodium salts of sulfonated dinaphthylmethane | 6 |
| $K_4P_2O_7$ | 6 |
| $H_2O$ | 231 |
| Magnesium oxide | 50 |
| Casein | 7 |
| Sorbitan monolaurate modified with ethylene oxide | 5 |
| $K_2P_2O_7$ | 1.5 |
| $H_2O$ | 177 |
| Tribasic lead maleate | 200 |
| Casein | 7 |
| Sodium salt of sulfonated dinaphthylmethane | 6 |
| $K_4P_2O_7$ | 6 |
| $H_2O$ | 181 |
| Calcium carbonate | 80 |
| Casein | 2.4 |
| Sodium salt of sulfonated dinaphthylmethane | 2.4 |
| $H_2O$ | 235 |
| Titanium dioxide | 1512 |
| Lithopone | 432 |
| Mica | 216 |
| Sodium salt of sulfonated dinaphthylmethane | 5 |
| $K_4P_2O_7$ | 11 |
| $H_2O$ | 1720 |

These compositions, after ball-milling to give fine dispersions of the solids, were mixed with the alkaline latex of chlorosulfonated polyethylene to give the following paints in which each of the four curing agents was used with four different amounts of a mixture of opacifying pigments. Each paint also contained methylcellulose (4 parts per 100 of the chlorosulfonated polyethylene), primarily as a thickening agent and additional casein (1.5 to 9 parts on the same basis) primarily as a dispersing agent.

In the following tables, the effects of exposure (chalking, checking, cracking, etc.) and their degree are given, together with the number of exposure hours at which the effect was first observed.

TABLE I

*Condition of paint films on wood 2000 hours exposure in Weather-Ometer*

| Curing Agent | Opacifying Pigments (parts per 100 parts of chlorosulfonated polyethylene) | | | |
|---|---|---|---|---|
| | 50 | 100 | 150 | 300 |
| MgO (20 parts) | OK | OK | chalking 500 | chalking 50. |
| PbO (40 parts) | sl. cracking 1,000 | heavy chalking 1,000 | heavy chalking 1,000 | cracking 100. |
| Tribasic lead maleate (40 parts) | sl. checking 1,500 | sl. checking 2,000 | checking 1,500 | heavy checking 100. |
| CaCO₃ (20 parts) | sl. checking 2,000 | cracking 2,000 | sl. cracking 2,000 | cracking 500. |
| Controls: | | | | |
| Commercial latex paint (butadiene-styrene latex base). | heavy cracking 500 | | | |
| Commercial outside paint (oil base) | heavy chalking 500 | | | |

Outdoor exposure (near Wilmington, Del.) for about one year of these same compositions on wood gave substantially the same results.

TABLE II

*Condition of paint films on concrete 1000 hours exposure in Weather-Ometer*

| Curing Agent | Opacifying Pigments | | | |
|---|---|---|---|---|
| | 50 | 100 | 150 | 300 |
| MgO (20 parts) | OK | OK | OK | OK. |
| PbO (40 parts) | OK | OK | OK | OK. |
| Tribasic lead maleate (40 parts) | OK | OK | OK | OK. |
| CaCO₃ (20 parts) | OK | OK | OK | OK. |
| Controls: | | | | |
| Commercial Latex Paint | checking | | | |
| Commercial Outside Paint | flaking | | | |

These exposure results show that these chlorosulfonated polyethylene compositions air dry at room temperature in one week or less to form weather-resistant coatings, many of which are much superior to the improved water paints, based on synthetic latex, now widely used, and are superior to oil paints when used on concrete surfaces.

I claim:

1. A process for producing a chlorosulfonated polyethylene coating at a temperature within the range of 5° to 40° C., which process comprises applying, over a surface to form a coating, an aqueous alkaline dispersion of a chlorosulfonated polyethylene containing a dispersed polyvalent metal compound curing agent selected from the group consisting of polyvalent metal oxides, polyvalent metal hydroxides and polyvalent metal salts of weak acids, said salts having an ionization constant of less than $1 \times 10^{-3}$ and a dispersed opacifying pigment.

2. The process of claim 1 in which the chlorosulfonated polyethylene contains 0.4 to 3.0% sulfur and 15 to 45% chlorine.

3. The process of claim 1 in which the aqueous chlorosulfonated polyethylene dispersion is made basic to a pH within the range of 8–11½.

4. An aqueous alkaline dispersion containing a dispersed chlorosulfonated polyethylene, curable at a temperature within the range of 5° to 40° C., a dispersed polyvalent metal compound curing agent selected from the group consisting of polyvalent metal oxides, polyvalent metal hydroxides and polyvalent metal salts of weak acids, said salts having an ionization constant of less than $1 \times 10^{-3}$ and a dispersed opacifying pigment.

5. The dispersion of claim 4 in which the cholorsulfonated polyethylene contains 0.4 to 3.0% sulfur and 15 to 45% chlorine.

6. The dispersion of claim 4 in which the pH of the aqueous chlorosulfonated polyethylene is within the range of 8–11½.

References Cited in the file of this patent

UNITED STATES PATENTS

| 2,416,061 | McAlevy et al. | Feb. 18, 1947 |
| 2,630,398 | Brooks et al. | Mar. 3, 1953 |

UNITED STATES PATENT OFFICE
CERTIFICATE OF CORRECTION

Patent No. 2,809,950                                        October 15, 1957

George Henry Bowers III

It is hereby certified that error appears in the printed specification of the above numbered patent requiring correction and that the said Letters Patent should read as corrected below.

Column 6, lines 12 and 46, for "salts", each occurrence, read --acids--.

Signed and sealed this 28th day of January 1958.

(SEAL)
Attest:

KARL H. AXLINE

Attesting Officer

ROBERT C. WATSON
Commissioner of Patents